June 3, 1930. R. W. DAVIS 1,762,130
MOTOR DRIVE
Filed March 24, 1923
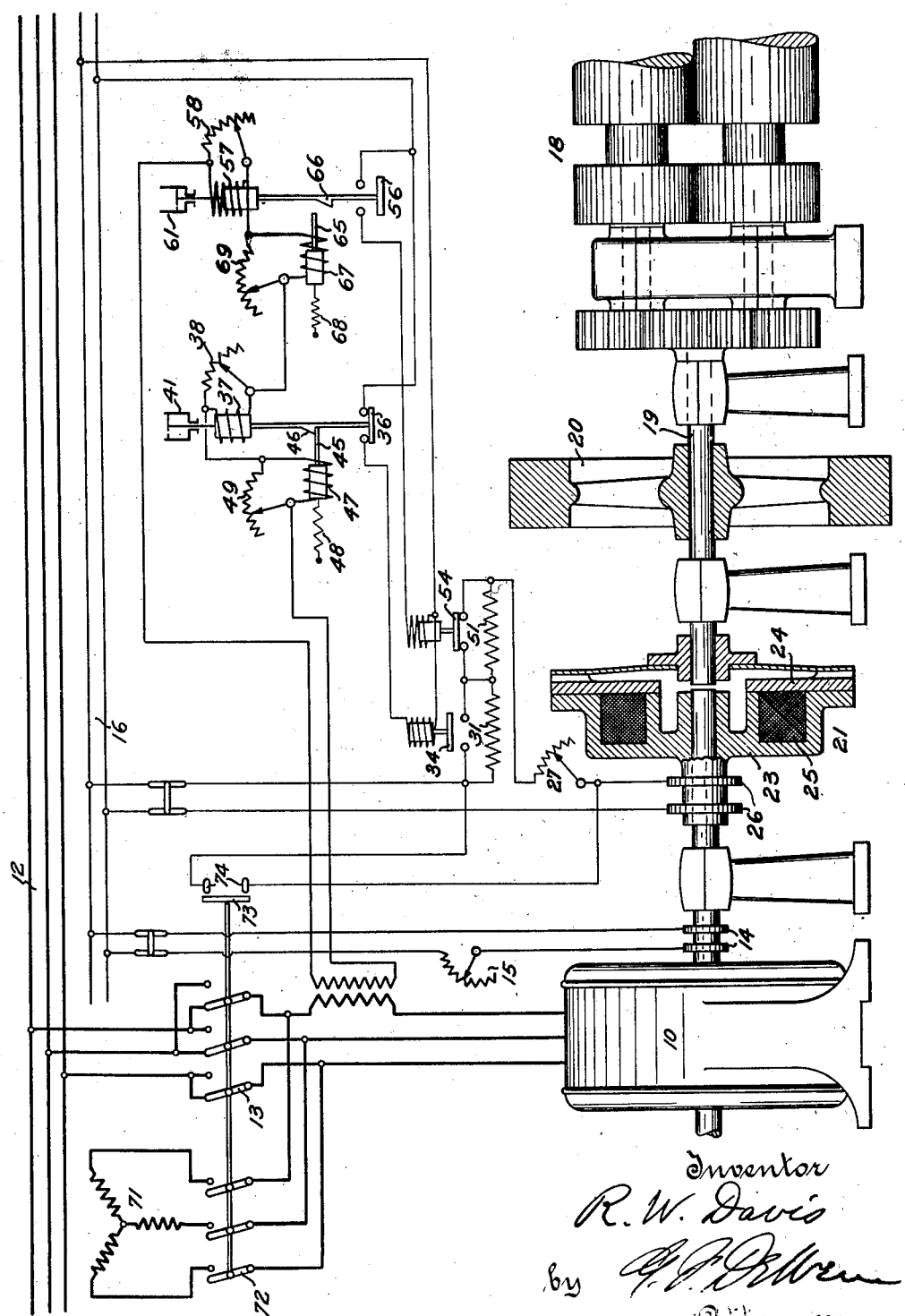
Inventor
R. W. Davis
by
Attorney Patented June 3, 1930

1,762,130

UNITED STATES PATENT OFFICE

RAE W. DAVIS, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE

MOTOR DRIVE

Application filed March 24, 1923. Serial No. 627,295.

This invention relates in general to motor drives, and has more particular relation to synchronous motor drives where the load varies over a considerable range.

It has been customary in the past to utilize induction motors for driving rolling mills and other loads whose values vary from practically zero to a figure considerably in excess of the normal rated load of the motor. In the ordinary installation, a motor of this character is slowed down as it becomes overloaded, permitting the exercise of greater torque on the mill shaft and likewise, permitting a flywheel, if present, to give up a portion of its energy for the purpose of assisting in carrying the load over peak values. Utilization of induction motors has been found quite satisfactory from a standpoint of actually carrying the load; but due to the fact that a load of this general character, such as a rolling mill, is subject to violent fluctuations from practically zero to a value equal to two or three times the normal rating of the driving induction motor, it will be apparent that there is a great and undesirable variation in the power factor of the line supplying the driving motor.

In accordance with general features of this invention, the driving motor is relieved of the strains due to the excessive peak conditions of the load which the motor drives; and the arrangement for relieving the motor of maximum load conditions and hence decreasing the total fluctuation in load on the motor is such as offers an opportunity of maintaining at a maximum value the power factor of the line which supplies the motor.

The invention includes as an embodiment the use of a synchronous motor as the driving element for a mill or other load, thus permitting the power factor of the line to be maintained at or increased to a miximum value, in connection with devices for insuring that the motor or the line is not subjected to overloads such as would cause excessive drains on the line or cause the motor to fall out of synchronous operation.

It is an object of this invention to provide a motor drive of improved design wherein the motor is effective to carry a variable load of violently fluctuating torque requirements without undue variation in the load on the motor.

It is a further object of this invention to provide an alternating current motor drive of improved design wherein the driving motor is effective to carry a variable load having peak values considerably in excess of the normal rating of the motor without decrease in speed thereof.

It is a further object of this invention to provide a motor drive of improved design wherein the driving motor is effective to drive a violently fluctuating load having peak values considerably in excess of the normal rating of the motor and wherein the load is connected to the motor through a clutch of automatically controllable slippage which permits an auxiliary power source of different or variable speed to aid in driving the load.

It is a further object of this invention to provide a motor drive of improved design wherein a synchronous motor drives a variable load through a clutch automatically controlled to vary the power that may be transmitted from the motor to the load.

These and other objects and advantages are attained by this invention, various novel features of which will be apparent from the description and drawings, disclosing an embodiment of the invention, and will be more particularly pointed out in the claims.

In the accompanying drawings, a system embodying features of this invention is diagrammatically shown.

In the embodiment of the invention illustrated, a synchronous motor 10 has its alternating current element supplied from an alternating current supply line 12, a switch 13, preferably of the oil-immersed type and reversible, and either manually or automatically operated, being inserted in the circuit to control the forward or reverse operation of the motor. The direct current field of the motor is supplied through slip-rings 14 and a variable resistance 15, from a direct current supply line 16.

The motor 10 is arranged to drive a variable load, here shown in the form of a pair or train of rolls of a rolling mill 18, the mill being driven by a pinion on the mill shaft 19. The mill shaft is preferably provided with a fly-wheel 20. The driving connection between the shaft of the motor 10 and the mill shaft 19 is through an electromagnetic clutch 21 having one element 23 mounted upon and rotatable with the shaft of the motor 10, and a second element rotatable with the mill shaft 19 and having a part 24 axially movable into and out of effective clutching relation with the actively energized part of the clutch element 23, dependent upon the degree of such energization. The clutch is energized, for the purpose of shifting the movable clutch element 24 into effective clutching relation with the clutch element 23 and holding it in frictional engagement with the latter part, either positively or impositively so as to permit a certain degree of slippage, by means of an energizing winding 25 on the clutch element 23, this winding being supplied from the direct current supply line 16, through slip rings 26 and a variable resistance 27, or other suitable provisions for varying the resistance of the clutch circuit, and hence the energization of the clutch.

As indicated, there is interposed in the clutch circuit, a resistance section 31 and means, in the form of an electromagnetically actuated switch 34 normally effective to close a short-circuit about the resistance section 31. As will be apparent, when the normal short-circuit about the resistance section 31 is interrupted at the switch 34, the energizing circuit of the clutch then includes the resistance section and the energizing effect of the winding 25 on the clutch is accordingly decreased. The normal energization of the clutch, that is, with the resistance 31 short-circuited, is such as to insure that the mill shaft 19 is locked to and rotated with the motor 10 on the occurrence of any load as high as is liable to occur on the mill. While it is apparent that the motor 10 will carry momentary or peak loads considerably in excess of its normal rating, say 200% of its normal rating, it is not desired that the motor be subjected to such loads to any greater extent than is necessary; for, aside from the fact these peak loads have a tendency to pull the motor out of synchronism and stall it, it is desirable to remove these peaks from the line to as great an extent as possible. It will be apparent that with a relatively heavy fly-wheel 20 on the mill shaft, a sufficient amount of energy may be stored in such fly-wheel to carry the mill through any momentary peak load condition, if the mill shaft be permitted to slow down so as to allow the fly-wheel to give up its energy; and where a synchronous motor is used for driving the mill, it is essential that this slowing down occur without interfering with the synchronous operation of the motor.

In order to insure the desired operation of the system on the occurrence of an overload on the mill and motor, an electromagnetically actuated switch 36, preferably responsive to the load on the motor 10, is provided which is effective to complete the energizing circuit of the electromagnetically actuated switch 34. The opening of the latter switch removes the normal short-circuit about the resistance 31, thus inserting the latter in the energizing circuit of the clutch and decreasing the energization thereof. The effect of thus weakening the energization of the clutch is to permit slippage thereof and consequent decrease in speed of the mill and giving up of energy by the fly-wheel. When the overload is removed from the mill, the excess torque which causes slippage of the clutch is no longer present and the clutch is effective, either with its weakened energization, or with the increased or normal energization, to pull the mill shaft and fly-wheel back to synchronous speed.

As here indicated, the operating magnet of the switch 36 is energized, by a winding 37 carrying current responsive to the load on the motor 10, the energizing circuit being preferably supplied from a current transformer in the supply line of the motor. The energizing effect of the winding of the switch 36 may be varied through a shunt resistance 38, and the winding thus calibrated to actuate the switch on the occurrence of any predetermined degree of overload on the motor. This overload switch 36 may operate instantaneously, but is preferably provided with a retarding device 41 which is of the inverse or inverse-definite time-element type wherein effective circuit-closing operation of the switch is secured on the occurrence and persistence of the overload on the motor 10 for a predetermined time interval dependent upon the degree of the overload.

The effect of inserting the resistance 31 in the clutch-energizing circuit, thus causing slippage of the clutch, is to relieve the motor of a portion of the mill load; and in order to prevent immediate opening of the switch 36 due to this decrease in load on the motor, it is preferable to provide means for insuring that the switch 36 is held closed as may be desired, this means being shown as including a latch 45 which cooperates with a stop 46 on the operating rod of the switch, in such a manner as to readily permit closure of the switch but prevent opening thereof when the load on the motor 10 is above a predetermined point. This latch 45 is here shown as being carried by the armature of an electromagnet 47 and held in latching position by the magnet when its winding which carries current proportional to the load on the motor, is energized to a degree corresponding to the predetermined load value below full load on the motor. When the load on the motor drops below this predetermined value, a biasing spring 48 is effective to move the latch out of the path of the stop on the switch arm. A variable shunt resistance 49 is provided for varying the current value in the winding of the electromagnet 47, and thus the value of current in the supply circuit of the motor 10, at which the latch 45 is operated.

The system as thus described will be satisfactory to take care of ordinary conditions of variable load upon the synchronous motor and the mill or other load element. To secure satisfactory results in an ordinary installation, that is, as to safe-guarding the motor and removing peaks from the line, it can be assumed that the electromagnetic switch 37 is designated to close on the occurrence of a 15 per cent overload on the motor 10, and the latch 45 is designed to permit opening of the switch 36 only when the load on the motor drops to 75 per cent of normal or full load value; and it may be assumed that the effect of inserting the resistance 31 in the circuit of the winding of the clutch is to so weaken the energization of the clutch as to permit it to transmit power to the mill shaft equal to only 90 per cent of the full load value or normal rating of the motor.

In the operation of a control system of the type described, utilizing only one resistance section 31 in the energizing circuit of the clutch, while the load on the motor 10 remains less than 15 per cent above full load value, the resistance 31 is short-circuited and the clutch 21 is fully energized and holds the mill shaft 19 to full synchronous operation with the motor. As the load on the mill rises to a value above a 15 per cent overload, as for instance, due to the passage through the rolls of a heavy billet or rod, the energization of the switch 36 becomes effective, either after a time interval or instantaneously, dependent upon the intensity of the overload, to cause closure of this switch and consequent energization and opening of the switch 34, thus causing such decrease in the energization and holding effect of the clutch 21 that the maximum power transmitted therethrough is equal to only 90 per cent of the full load value or normal rating of the motor. With this weakened clutch energization, the torque required to drive the mill at normal speed cannot be transmitted through the clutch and slipping of the clutch occurs; and the mill slows down, thus permitting the fly-wheel 20 to give up its stored energy so as to carry the peak load on the mill. As the load on the mill subsequently drops below the value that may be transmitted through the clutch, that is, 90 per cent of full load, the mill shaft with its fly-wheel is speeded up, the clutch slipping to such an extent as to prevent the motor from carrying a load in excess of the predetermined 90 per cent full load value. When the load on the motor 10 has decreased to 75 per cent of the full load value, which may occur only when the mill shaft with its fly-wheel has been brought back to normal speed, the energizing coil of the latch 45 is no longer effective to hold the latter against the normal bias of the spring 48, and the switch 36 is permitted to open, with the consequent short-circuiting and removal of the resistance element 31 from the energizing circuit of the clutch.

In order to secure a more refined operation of the system, there may be one or more additional sections of resistance, corresponding to the resistance section 32, the insertion and removal of which from the clutch circuit is controlled by operating means corresponding to that utilized with the resistance section 31. As indicated herein, a second resistance section 51 is provided, and a switch 54 is arranged to open a normal short-circuit about the resistance 51 to cause its insertion in the clutch energizing circuit. The energizing circuit of the switch 54 is closed through an electromagnetically operated switch 56 having an energizing winding 57 carrying current responsive to the load on the motor 10, controlling resistance 58 and time-element controlling device 61. This switch 56 may be provided with a latch 65 and stop 66 and electromagnetic control therefor comprising a magnet 67, biasing spring 68 and controlling resistance 69 similar to corresponding elements 47, 48 and 49 of the switch 36.

Assuming that the actuating means for the switch 36 which controls the resistance section 31 is of the inverse or inverse-definite type, the actuating means for the switch 56 which controls the resistance section 51 may be of the same general type as to time-element. The design of the control means for the switch 56 is such as insures closure of the latter only in case the load on the motor 10 reaches a value considerably in excess of 15 per cent overload, say a value of 40 per cent overload, and that resistance 51 will be inserted in the clutch circuit only when resistance 31 is inserted. The effect of inserting the resistance 51 in addition to the resistance 31 is to reduce the energization of the clutch so as to permit transmission thereby of power equivalent to 75 per cent of full or normal load on the motor 10. The electromagnet 67 may be calibrated so as to release the latch 65 and permit opening of the switch 56 when the load on the motor 10 drops to 75 per cent of full load or normal rating of the motor.

With the additional resistance 51 and its controlling means as part of the system, the switch 56 is closed when an overload of 40 per cent has persisted for a suitable predetermined period, and this causes insertion of the resistance section 51 in the clutch energizing circuit, and the consequent further decrease in the clutch energization. This permits greater slippage of the clutch and more readily permits the mill and the fly-wheel 20 to slow down, thus more readily permitting the fly-wheel to give up its energy and carry the mill load over the peak value. The effect of increased slippage of the clutch is to decrease the permissible load on the motor 10 to 80 per cent of its full load value. As the mill load decreases to a value less than 80 per cent of full motor load, the motor is effective to transmit power through the clutch to accelerate the mill shaft; and as the load drops to 75 per cent of normal, the latch 65 is released permitting opening of the switch 56 and short-circuiting of resistance 51, permitting an increase in the power transmissible through the clutch to the mill shaft. As described before, when the load on the motor drops to 75 per cent of full load value, resistance 31 is removed from circuit.

It will be apparent that there may be considerable modification in the arrangements described hereinabove as to the control of the maximum value of power transmissible by the clutch. For instance, the two latches 45 and 65 may be arranged to be released when the motor load is at the same value, operation of latch 65 before latch 45, being insured by suitable time-element devices associated with the two latches; or the desired sequential or simultaneous operation of the latches 65 and 45 may be secured through a device responsive to a decrease in the mill load to a desired value or the subsequent initial increase in speed of the mill shaft due to initial acceleration of the mill by the motor. Likewise, the devices for controlling the resistance sections 31 and 51 may be arranged to insert the resistances in response to the same degree of overload on the motor but in response to persistence of such overload for different time intervals.

The type of clutch used may vary to a considerable degree from that shown and described. As to certain features of the invention, the clutch may be of any suitable type which will permit driving the mill shaft positively, that is, without slip, or impositively, that is, so as to permit a degree of slip dependent upon the energizing force used to hold the clutch parts in clutching relation or dependent upon the load.

The load requirements may, in some cases, be such as not to require any special rotatable element of great inertia as an auxiliary source of energy, such as the fly-wheel 20, the rotor of the motor having sufficient fly-wheel effect for the particular purpose.

In order to brake the motor 10 and thus facilitate quick reversal thereof and of the mill shaft driven thereby, the alternating current winding of the motor is short-circuited through a resistance 71 so as to secure dynamic braking of the motor, a switch 72 being inserted in the connection to the short-circuiting resistance. The switch 72 is preferably operatively connected or associated with the reversing switch 13 which connects the motor 10 to the alternating current supply line 12 so that when the switch 13 is moved from either of its operative positions to its intermediate or open position, the switch 72 is actuated to closed position wherein it short-circuits the alternating current winding of the motor through the resistance 71. With the alternating current winding of the motor thus connected and field of the motor supplied with direct current through the slip rings 14, a powerful braking effect may be exerted on the motor and the same brought to a stop in a relatively short space of time.

To further faciltate stoppage of the motor, it is desirable that the entire mill load be carried by the motor during braking; and special means are provided for short-circuiting all of the resistance in the energizing circuit of the clutch 21 whenever the motor is brought to a stop while there is an overload upon the mill shaft, at which time the energization of the clutch is ordinarily weakened by having one or more of the resistance sections 31, 51, included therein. A preferred method of insuring full energization of the clutch during stoppage of the motor, is to so associate a switch member 73 with the reversing switch 13 that the resistance sections 31 and 51 and the adjustable rheostat 27 in the clutch energizing circuit are all short-circuited and, hence, removed from the energizing circuit at the time of or just prior to closing the alternating current winding through the short-circuiting resistance 71. As indicated, the fixed contacts 74 associated with the switch 73 may be of such elongated form and so disposed relative to the movable switch member 73, that, as the reversing switch 13 is moved to open position from either of its operative positions, the short-circuit about the resistance elements in the clutch circuit is first established and the switch 13 is subsequently closed. It will be obvious that the desired association between the switches 13, 72 and 73 may readily be provided through automatically actuated devices, especially when one or more of these switches is electro-magnetically actuated.

It should be understood that the invention claimed is not limited to the exact details of design and construction shown and described herein, for obvious modifications will occur to a person skilled in the art.

It is claimed and desired to secure by Letters Patent:

1. In combination, a synchronous motor, a variable load driven thereby, an electro-magnetically actuated clutch between said motor and said load, and means responsive to a predetermined load for weakening the energization of said clutch until said load drops to a predetermined value while permitting said motor to operate at synchronous speed.

2. In combination, a synchronous motor, a variable load driven thereby, a fly-wheel associated with said load, an electromagnetically actuated clutch between said motor and said load, and means responsive to the load on said motor for varying the maximum power transmissible through said clutch, said means comprising instrumentalities operative to insert resistance in the energizing circuit of said clutch while permitting said motor to operate at synchronous speed.

3. In combination, a synchronous motor, a variable load driven thereby, a fly-wheel associated with said load, an electromagnetically actuated clutch between said motor and said load, means responsive to the load on said motor for varying the maximum power transmissible through said clutch, said means comprising instrumentalities operative in response to an overload on said motor to selectively weaken the energizing circuit of said clutch.

4. In combination, a synchronous motor, a variable load driven thereby, a fly-wheel associated with said load, an electromagnetically actuated clutch between said motor and said load, means responsive to the load on said motor for varying the maximum power transmissible through said clutch, said means comprising instrumentalities operative in response to the occurrence of overload conditions on said motor for selectively including one or more resistance sections in the energizing circuit of said clutch until the load on said motor drops below a predetermined subnormal value.

5. In combination, a synchronous motor, a variable load driven thereby, a fly-wheel associated with said load, an electromagnetically actuated clutch between said motor and said load, means for varying the maximum power transmissible through said clutch, said means comprising instrumentalities operative in response to the existence of predetermined overload conditions for a time interval dependent upon the degree of such overload for selectively decreasing the energization of said clutch while the load remains above a predetermined value.

6. In combination, a motor, a variable load operable thereby, a driving connection between said motor and said load, load responsive means for reducing the maximum power transmissible through said driving connection, means for braking said motor, and means for insuring that the full power of said load is transmitted through said driving connection during said braking operation.

7. In combination, a motor, a variable load operable thereby, an electromagnetically actuated clutch operable to transmit power of variable maximum value between said motor and said load, means responsive to the load on said motor for decreasing the energization of said clutch on the occurrence of predetermined overload conditions to relieve said motor of a portion of said load, means for braking said motor, and means operative to insure that said clutch is fully energized during said braking operation.

8. In combination, a motor, a variable load operable thereby, an electromagnetically actuated clutch operable to transmit power of variable maximum value between said motor and said load, means responsive to the load on said motor for weakening the energization of said clutch on the occurrence of predetermined overload conditions to permit relative rotation between said motor and said load, means for causing the operation of said motor as a generator for braking purposes, and means operative during said braking operation for insuring the full energization of said clutch.

9. In combination, an electric motor, a variable load operable thereby, an electromagnetically actuated clutch between said motor and said load, means responsive to the occurrence of overload conditions on said motor for decreasing the maximum power transmissible through said clutch, said means comprising instrumentalities operative to include resistance in the energizing circuit of said clutch, means for dynamically braking said motor, and means operatively associated with said braking means for insuring the exclusion of said resistance from the energizing circuit of said clutch during braking of said motor.

10. In combination, a synchronous motor, means for selectively connecting the alternating current winding of said motor to a supply line and to a short-circuited resistance, a variable load driven by said motor, a flywheel associated with said variable load, an electromagnetically actuated clutch between said motor and said load, means responsive to overload conditions on said motor for decreasing the energization of said clutch until the load on said motor drops below a predetermined value, means operatively associated with said connecting means for insuring that said clutch is energized to a maximum degree when said motor is connected to said short-circuited resistance.

11. In combination, a synchronous motor, a short-circuited resistance, switch means operative to selectively connect said motor to said supply line or to said short-circuited resistance for braking purposes, a variable load operable by said motor, a fly-wheel associated with said load, an electromagnetically actuated clutch between said motor and said load, means responsive to an overload on said motor for varying the energization of said clutch, said means comprising instrumentalities operable in response to predetermined overload conditions to selectively include one or more resistance sections in the energizing circuit of said clutch, said means being operable to maintain said resistance in circuit until the load on said motor drops below a predetermined subnormal value, means operatively associated with said switch means and adapted to exclude resistance from the energizing circuit of said clutch to thereby increase the power transmissible through said clutch during said braking operation.

12. In combination, a synchronous motor, a variable load driven thereby, a rotatable element of great inertia associated with said variable load, a driving connection between said motor and said load, and means for decreasing the power transmissible through said driving connection as the load on said motor increases above a predetermined value to permit said inertia element to give up a portion of its energy to said load.

13. In combination, a synchronous motor, a variable load driven thereby, a rotatable element of great inertia associated with said variable load, an electromagnetic clutch between said motor and said load and including means for variably energizing the clutch, and means for controlling the energization of said clutch whereby said energization may be reduced while the load is above a predetermined value to permit slippage of said clutch and to enable said inertia element to give up a portion of its energy.

14. In combination, a synchronous motor, a load shaft carrying a variable load driven thereby, a fly-wheel associated with said load, and means operative on rise of said load to an abnormal value to cause a reduction in the power furnished by said motor to a value in excess of one half its normal rating without decrease in the speed of said motor and to permit a decrease in the speed of said load shaft to thereby enable said fly-wheel to give up a portion of its energy and thus assist said motor in supplying the load requirements.

15. In combination, a synchronous motor, a variable load operable thereby, a rotatable element of great inertia associated with said variable load, a driving connection between said motor and said load, means operative to reduce the maximum power transmissible through said driving connection, means for braking said motor, and means for insuring that the full power of said load is transmitted through said driving connection during said braking operation.

16. A method of driving a variable load including a fly wheel and of momentary power requirements considerably in excess of the normal power rating of a synchronous motor drivingly connected to said load through a clutch capable of permitting slippage between said motor and said load, which comprises the step of causing said clutch to slip when the load on the motor reaches an abnormal value to thereby reduce the load on said motor and permit said fly-wheel to give up a portion of its energy.

17. A method of driving a variable load of momentary power requirements considerably in excess of the normal power rating of a source of power drivingly connected to said load, which comprises reducing the power transmissible from said source to said load on the occurrence of a predetermined maximum load on said source to a safe value for said source and supplying the excess requirements of said variable load from an auxiliary source of power.

18. In combination, a motor, a variable load, an auxiliary source of power, a driving connection between said motor and said load adapted to transmit power in excess of the full load rating of said motor, and means operative on the occurrence of a predetermined excess value of said variable load for reducing the power transmissible from said motor to said variable load to a safe load on said motor and for causing said auxiliary source to supply the requirements of said variable load in excess of said safe load value.

19. In combination, a synchronous motor, a variable load of momentary power requirements in excess of the normal rating of said motor, an auxiliary power source normally ineffective for the purpose of supplying power to said variable load, and means for insuring that the power supplied by said motor to said load is limited to a predetermined safe value and that the excess power requirements of said variable load are supplied from said auxiliary power source.

20. In combination, a synchronous electric motor connectible to drive a load of variable power requirements, the driving connection between said motor and said load including a variably energizable electromagnetic clutch, an auxiliary source of energy connectible to drive said load, and means responsive to the load on said motor for causing the energy requirements of said load up to predetermined values thereof to be supplied by said motor through said clutch and that part of the energy requirements of said load in excess of said predetermined values to be supplied by said auxiliary source of energy.

In testimony whereof, the signature of the inventor is affixed hereto.

RAE W. DAVIS.